United States Patent [19]

Dechelette

[11] E Patent Number: Re. 32,898

[45] Reissued Date of Patent: Apr. 4, 1989

[54] MULTIGAUGE INSULATION DISPLACEMENT CONNECTOR AND CONTACTS THEREFOR

[75] Inventor: Helen Dechelette, London, England

[73] Assignee: Molex Incorporated, Lisle, Ill.

[21] Appl. No.: 55,088

[22] Filed: May 28, 1987

Related U.S. Patent Documents

Reissue of:

[64] Patent No.: 4,527,852
Issued: Jul. 9, 1985
Appl. No.: 521,769
Filed: Aug. 9, 1983

[51] Int. Cl.[4] ..... H01R 4/24

[52] U.S. Cl. ..... 439/395

[58] Field of Search ..... 439/389–426

[56] References Cited

U.S. PATENT DOCUMENTS

| | | | |
|---|---|---|---|
| 3,761,866 | 9/1973 | Ledlacek | 339/97 P |
| 4,088,382 | 5/1978 | Ichimura | 339/99 R |
| 4,116,522 | 9/1978 | Reynolds | 339/97 R |
| 4,159,158 | 6/1979 | Weidler | 339/97 P |
| 4,333,700 | 6/1982 | Pugh | 339/97 R |

*Primary Examiner*—Joseph H. McGlynn
*Attorney, Agent, or Firm*—John W. Cornell; Louis A. Hecht

[57] ABSTRACT

An electrical connector comprises a housing fitted with one or more contact members which have the capability of terminating an insulated multi-stranded conductor by displacement of the conductor insulation. The contact member comprises a stamped and formed metallic plate member having an insulation displacement slot which defines, at an end of the plate, a pair of limbs and a relatively wide conductor receiving mouth. The slot tapers from the mouth to a pair of opposed teeth positioned one on each limb in juxtaposed relationship. The teeth are configured to point in the general direction of the mouth and they serve to initiate severing of the conductor coating. The plate may further comprise a pair of coined protrusions adjacent a further narrowed portion of the slot for separating the conductor coating and providing an improved electrical interface between the conductor strands and contact.

5 Claims, 5 Drawing Sheets

MULTIGAUGE INSULATION DISPLACEMENT CONNECTOR AND CONTACTS THEREFOR

Matter enclosed in heavy brackets [ ] appears in the original patent but forms no part of this reissue specification; matter printed in italics indicates the additions made by reissue.

FIELD OF THE INVENTION

This invention concerns a multigauge insulation displacement connector and contacts therefor, and particularly concerns such a connector and contacts adapted for use with multistranded conductors.

BRIEF DESCRIPTION OF THE PRIOR ART

Insulation displacement connectors do not require the stripping of insulation from a section of an insulated conductor preparatory to insertion of the conductor into the connector. Rather, they rely upon displacement of the insulation of the conductor by the sides of a slot in a contact or terminal member into which the conductor is introduced.

Many different forms of insulation displacement connectors have been successfully marketed in recent years. A need still exists for such a connector which not only is usable with multistranded conductors, but also is usable with a range of conductor sizes or gauges. The difficulties which arise in the application of insulation displacement technology to connectors for use with multistranded conductors are known and are discussed in U.S. Pat. No. 4,317,608 issued Mar. 2, 1982, for example, to which reference may be made. Generally, these difficulties result from underside rearrangement of the conductor strands upon their insertion into the connector contact member. As a consequence of such rearrangement, a reliable electrical connection between the conductor and contact member cannot be assured, particularly if the connector is to be used with varying conductor sizes.

SUMMARY OF THE INVENTION

It is, therefore, a principal object of the present invention to provide an improved contact member for an electrical connector having the capability of establishing a reliable electrical connection with a stranded wire.

A further object is to provide a contact member which is equally suitable for use with both small and large gauge wires.

Yet another object is to provide such a contact member with means for selective connection to a mating terminal member.

A still further object of the present invention is to provide a housing member into which a plurality of the contact members may be inserted thereby providing an improved connector assembly.

The foregoing and other objects and advantages are accomplished by the present invention in the provision of an improved contact member comprising a stamped and formed plate member having a slot of relatively long length for accommodating a relatively larger number of conductor core strands than heretofore, and with a relatively wide mouth portion of the slot leading in a generally tapering or narrowing fashion to at least one pair of opposed teeth. One tooth of each such pair is provided on a respective side of the slot and is intended to pierce and remove insulation from an insulated conductor as it is introduced into the slot. The contact member may also include formations on opposite sides of the slot which protrude outwardly from a surface of the plate member and serve to separate the insulation displaced by the slot. Limb portions defined by the slot are designed to accept deformation substantially uniformly along their lengths upon wire insertion. Accordingly, stresses are not transferred to the housing in concentration.

Additionally, the bight of the U-shaped contact member can be bifurcated to receive a blade-like spade terminal, for example.

BRIEF DESCRIPTION OF THE DRAWINGS

In order that the invention might be clearly understood, together with the further objects and advantages thereof, the following detailed description of preferred embodiments may be referred to, wherein.

DESCRIPTION OF THE PREFERRED EMBODIMENT

Figure 1:
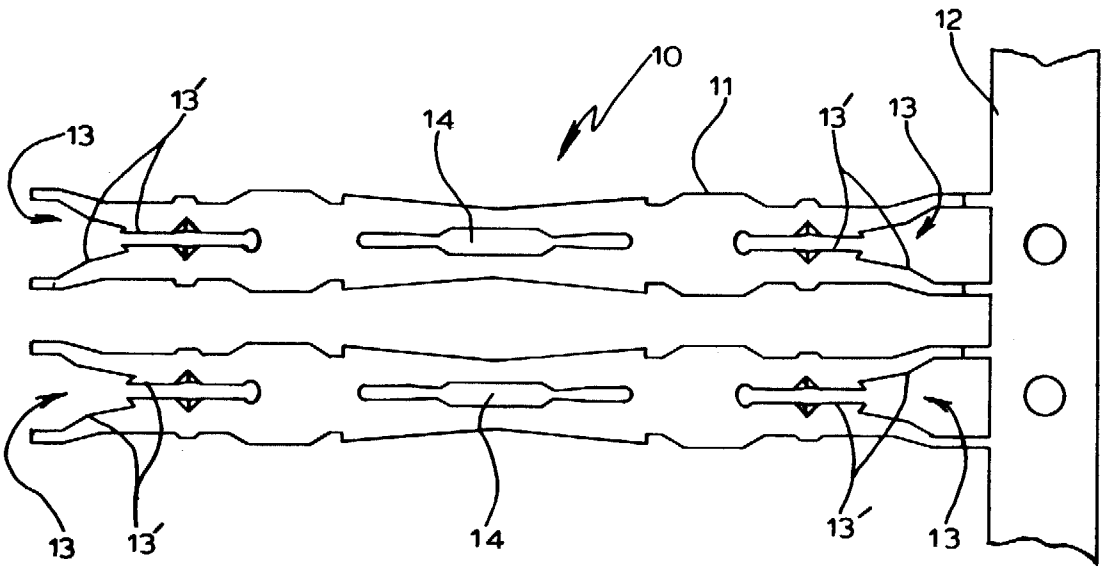
FIG. 1 shows a portion of a sheet metal stamping used for manufacturing contact members according to one embodiment of the invention.

Referring first to FIG. 1 There is shown a blank, designated generally by the reference numeral 10, formed by stamping suitable metal of selected thickness in sheet or strip form. The blank 10 includes a plurality of plate-like elongated contact blanks 11, each connected at one end to a carrier strip 12. Each blank 11 comprises an insulation displacement slot formation 13 at both ends, thereof, defining edge surfaces 13' which are of suitable sharpness to sever the insulation of a conductor. Intermediate the said ends is an elongate slot 14 of predetermined shape, which will be described in greater detail hereafter. Each blank 11 is generally symmetrical, both longitudinally and transversely and is designed to be folded end-to-end into a generally U-shape as shown in FIG. 2.

Folding of a blank 11 defines a double-ended insulation displacement contact 15 with the insulation displacement slot formations 13 in alignment with one another. At the bend or bight of the U-shape, the elongate slot 14 defines a bifurcated contact formation suitable to engage a spade terminal or the like.

Figure 2:
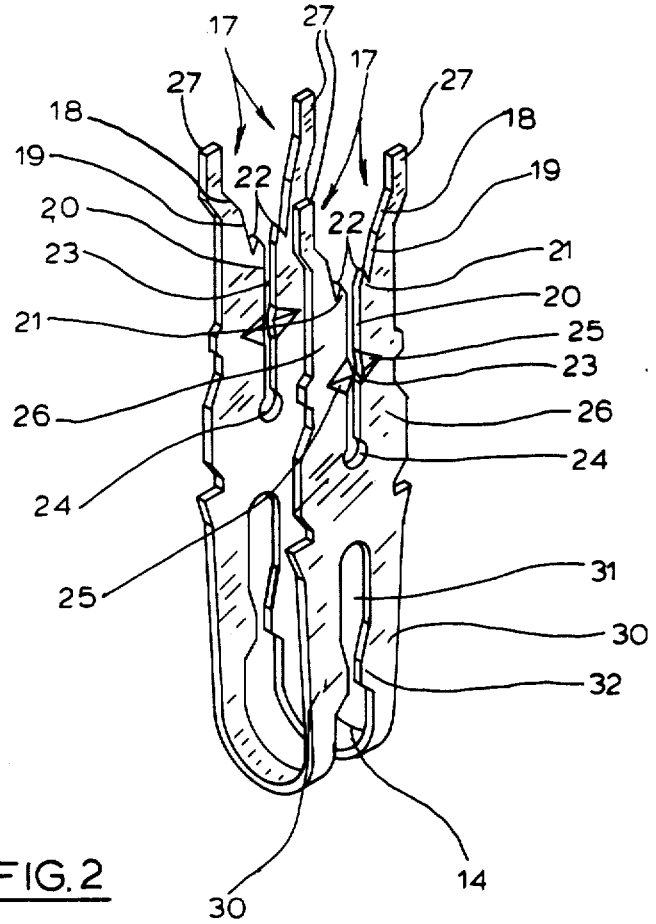
FIG. 2 shows in enlarged perspective view a contact member formed from the sheet metal stamping of FIG. 1.

Looking at FIG. 2, the insulation displacement slot 13 of contact 15 is seen to include a relatively wide mouth 17, with the slot being narrowed inwardly in a stepped and tapering fashion through three stages, designated generally by the reference numerals 18, 19 and 20, respectively. A pair of teeth 21 of sharp triangular shape and juxtaposed on opposite sides of the slot 13 project from the regions defined between stepped portions 19 and 20 with their apeces pointed generally inwardly of the slot 13 towards the open mouth 17. Opposed edges 22 of the teeth 21 taper inwardly towards each other in a direction away from the mouth 17. Stepped portions 20 define a generally parallel section 23 of relatively long length which terminates in an enlarged hole 24. About midway along the length of the parallel section 23, each side of the insulation displacement slot 13 has a slight protrusion 25 projecting from one surface of the blank 11, formed therein as, for example, by coining of the blank 11.

The insulation displacement slot 13 thus defined lies between two limbs 26 which taper so as to be to a degree resiliently flexible. Free ends 27 of the limbs 26 adjacent the open mouth 17 of the slot 13 are sufficiently narrow such that the limbs 26 are bendable along their entire length.

Figure 6:
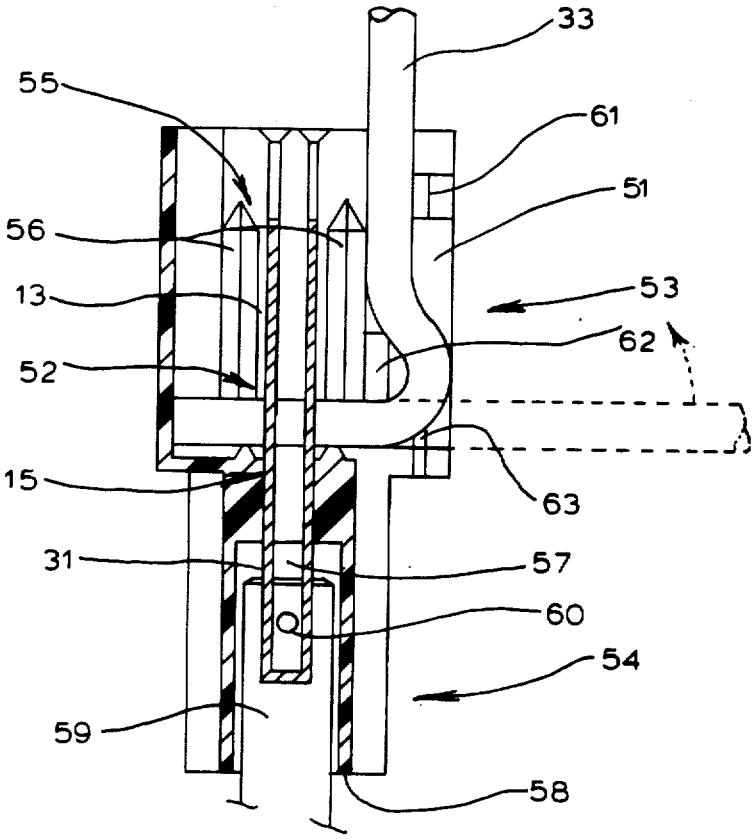
FIG. 6 shows a sectional view on taken generally along the line 5—5 of FIG. 5.

The elongate slot 14 formed in the blank 11 results in bifurcation of the bight of the contact member 15 to define two opposed limbs 30 which form therebetween a female contact receptacle 31 adapted for receiving a male contact member (shown in FIG. 6). The slot 14 is further adapted with lugs 32 projecting into the female contact receptacle 31.

Figure 3:
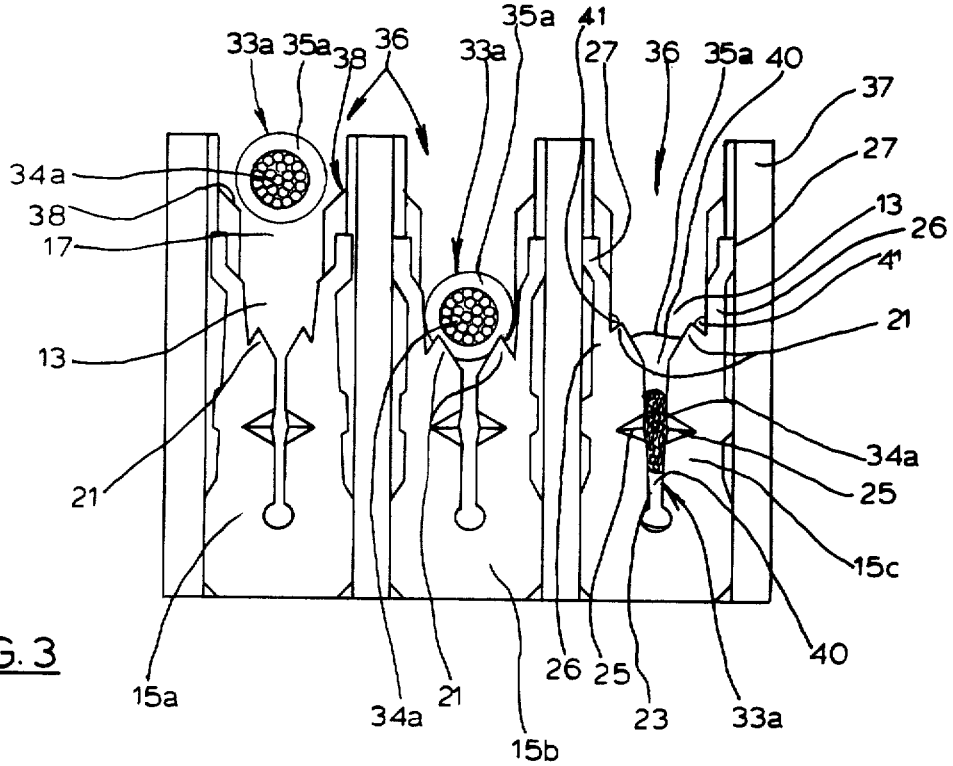
FIG. 3 shows stages in the insertion of a small gauge multistranded conductor into the contact member of FIG. 2.

FIG. 3 shows various steps in the insertion of a relatively small gauge, multistranded, insulated conductor 33a into the insulation displacement slot 13 of three contact members as just described, designated 15a, 15b and 15c. The contact members 15a, 15b, and 15c are each identical in their construction and accordingly, like reference numerals will be used, hereinafter to describe the operation of their various features.

The conductor 33a comprises multiple strands of conductive wire 34a coated with a layer of insulation 35a. Each contact member 15a, 15b and 15c is schematically shown engaged in an accommodating recess 36 in an illustrative connector housing 37. Contact 15a is shown with the conductor 33a being guided by wall formations 38 in the housing 37 towards the mouth 17 of the insulation displacement slot 13. Contact 15b is shown with the conductor 33a just engaged with the insulation piercing teeth 21 of slot 13 and with the teeth 21 just beginning to penetrate and to pare off a section of the conductor insulation 35a. Contact 15c is shown with the conductor strands 34a lodged well down into the generally parallel section 23 of the insulation displacement slot 13 in the region of the coined protrusions 25, where the protrusions 25 slightly widen and strengthen the slot 13.

A further advantage of the protrusions 25 is that they cooperate to separate the insulation 35a longitudinally of the wire 33a inasmuch as they protrude from the blank 10 in oppositely directed pairs (FIG. 2). This separation of the insulation 35a allows for greater exposure of the conductor strands 34a to the contact slot 13. A plug of insulation 40c remains above and below the conductor strands 34a in the slot 13 of the contact member 15c and remnants 41c of pared off insulation remain on the teeth 21. The teeth 21 thus serve, when the conductor core gauge is small relative to the insulation thickness, to positively pare away part of the insulation and thereby reduce the insulation displacement task of the parallel section 23 of the slot 13.

The limbs 26 of contact 15c is slightly opened as the conductor strands 34a are forced into the slot 13. This brings the free ends 27 of the said limbs 26 into abutting engagement with the housing 37.

Figure 4:
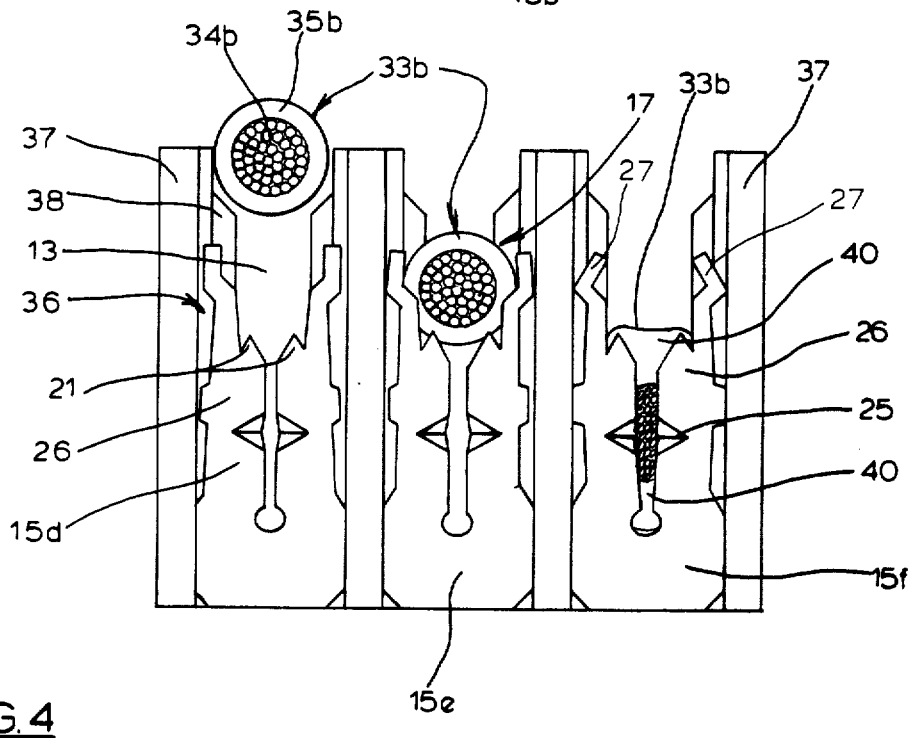
FIG. 4 shows corresponding stages in the insertion of a relatively large gauge multistranded conductor into the same contact member of FIG. 2.

FIG. 4 is similar to FIG. 3 but shows the insertion of a considerably larger gauge conductor 33b into contacts 15d, 15e and 15f. For purposes of clarity, contacts 15a, 15e and 15f have been shown with reference numerals corresponding to like elements of the contact 15 illustrated in FIG. 2.

Notable in FIG. 4 as compared to FIG. 3 is the earlier deformation of the conductor cross-section as the conductor 33b is forced into the mouth 17 of the contact 15e, and the increased deformation of the limbs 26 which bow as the larger conductor 33b is inserted. The additional strains involved are to a great extent accommodated within the contact member 15f itself, rather than being transferred to the connector housing 37. This has the desirable effect of minimizing the risk of housing distortion.

Figure 5:
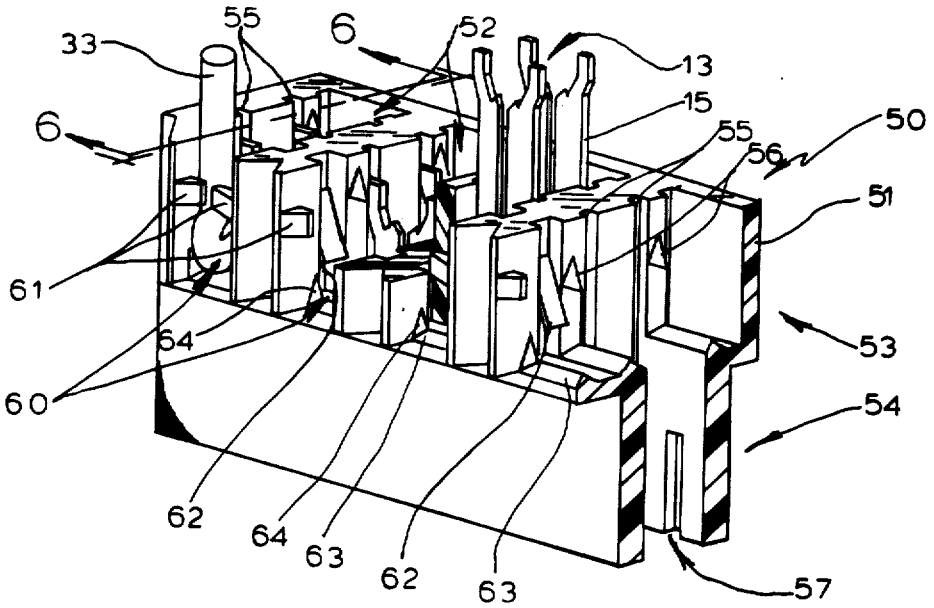
FIG. 5 shows, in perspective view, a four circuit connector in accordance with the invention which employs a contact member according to the preceding Figures.

Referring now to FIGS. 5 and 6, there is shown therein a four circuit connector 50 for use with a contact member 15 as above described. The connector 50 comprises a one piece housing 51 of glass filled Nylon, for example, having a plurality of open ended recesses or channels 52 therein for receiving the contacts 15. Access is provided at the top and bottom ends of the housing 51 to the insulation displacement slot 13 and the female receptor 31, respectively, of each contact 15.

As shown most clearly in FIG. 6, the housing 51 and the recess 52 therein have upper and lower portions 53 and 54, respectively, which provide accommodation for the (upper) insulation displacement portion 13 of the contact member 15 and the (lower) female receptor 31, respectively. The upper portion 53 has formed therein opposed pairs of grooves 55 into which the edges of the two insulation displacement portions 13 of the contact member 15 engage when the contact member 15 is received in the housing recess 52. The upper portion 53 also has a pair of ribs 56 of triangular cross-section disposed one on either side of the pairs of grooves 55, the ribs 56 being tapered at their upper ends, as best seen in FIG. 5, to provide guidance to a conductor 33 introduced into the recess 52. Not only do the ribs 56 provide the guidance aforementioned, but also they serve to strengthen the housing and to retain a conductor 33 once it has been engaged with the connector.

As best seen in FIG. 6, the lower part 54 of the housing recess 52 is of simpler form and comprises a major portion 57 which accommodates the contact receptacle 31 of the contact member 15 and slotted portions 58 extending at right angles off of the major portion 57. The slotted portions 58 serve to guide and retain a tab terminal 59 inserted into contact with the contact receptacle 31 of the contact member 15. Although not shown, slotted portions 58 may be configured such that tab terminal 59 is offset laterally with respect to the contact receptacle 31, allowing an aperture 60 of the tab terminal 59 to be engaged by the lugs 32 of the female receptor 31, thereby effecting a locking function.

The housing 51 further comprises entry ports 70 which are provided with a variety of strain relief formations 61 enabling a conductor 33 received in the connector 50 to be bent substantially through 90 degrees so as to extend from the connector 50 generally parallel to the longitudinal axes of the terminals 15, as illustrated in FIG. 6. A pair of opposed, resilient strain relief fingers 62 depend from the housing walls within the entry port 70 and are such as to be resiliently deformable out of the path of a conductor 33 introduced into the connector 50 by contact with the conductor 33. Once the conductor 33 has been fully positioned, the strain relief fingers 62 resume their original disposition and prevent withdrawal of the conductor 33. Also provided is a member 63 of generally triangular cross-section which performs a function similar to that of the ribs 56, and opposed members 64 which serve as conductor guiding and retaining means particularly when, as aforementioned. the conductor is bent through 90 degrees to exit from the connector 50.

The connector 50 described is particularly, though not exclusively, useful in consumer and automotive applications where it lends itself to automatic assembly of wiring harnesses and can reliably mate with standard terminal tabs. As an example of the gauge range which might be accommodated, a connector according to the invention might be designed for use with multistranded conductors ranging from 0.5 mm (16 strands each of 0.2 mm diameter) to 1.5 mm (30 strands each of 0.25 mm diameter) core area with insulation thicknesses of the order of 0.6 mm to 0.7 mm providing an overall conductor diameter range of 2.2 mm to 3.2 mm. Although the illustrative embodiment is of a four circuit connector, any number of circuits may be terminated in accordance with the principles of the invention, within the ordinary skill in the art.

We claim:

1. A U-shaped, stamped metal electrical contact member adapted to be mounted in a terminal receiving cavity of a connector housing for connecting an insulated conductor to an external terminal, said contact member including two opposed leg portions, each with a free end and a bight jointed end and each leg portion having a slot formed therein including a wire receiving mouth converging towards and leading to opposed insulation cutting edge surfaces which provide electrical connection to an insulated conductor, said contact member further including a bight portion extending between the bight joining ends of the leg portions, the improvement comprising:

each slot extending from the free end of each leg portion towards the bight joining end thereof, with each leg portion including two opposed spaced-apart transversely deflectable resilient limb portions each having an upper free end at the mouth having outwardly extending housing engaging means for engaging portions of the connector housing defining the terminal receiving cavity to limit outward deflection of said limbs when urged apart by insertion therebetween of an insulated wire, whereby the portion of each limb portion below the free end is outwardly bowed upon continued insertion of said insulated wire.

2. The contact member of claim 1 wherein said free end limb portions include diverging tapered members having a reduced cross section adjacent said housing engaging portions to provide a second resilient mounting of said limb portions to accommodate said outward housing thereof.

3. The contact member of claim 1 wherein each limb portion includes an insulation piercing tooth projecting into the slot.

4. The contact member of claim 1 wherein said bight portion includes terminal receiving means for receiving the external terminal so as to form a separable electrical connection therewith.

5. The contact member of claim 4 wherein said external terminal includes a flat blade and said terminal receiving means includes a bifurcated wall having an elongated slot extending generally between the bight joining ends, said slot having opposed inwardly extending contact lugs with contact surfaces for engaging the blade.

* * * * *

UNITED STATES PATENT AND TRADEMARK OFFICE

CERTIFICATE OF CORRECTION

PATENT NO. : Re. 32,898

DATED : April 4, 1989

INVENTOR(S) : Helen Dechelette

It is certified that error appears in the above-identified patent and that said Letters Patent is hereby corrected as shown below:

Title page:

Prior to the line:

[51] Int. Cl.[4] ..... H01R 4/24

Insert:

[30] Foreign Application Priority Data

Aug. 9, 1982 [GB] United Kingdom..... 22892/82

Signed and Sealed this

Twenty-sixth Day of December, 1989

*Attest:*

JEFFREY M. SAMUELS

*Attesting Officer* *Acting Commissioner of Patents and Trademarks*